2,873,259

RUBBERY FLEXIBLE CLOSED CELL PRODUCT

Lawrence Clark, Lancaster, Pa., assignor to Armstrong Cork Company, Lancaster, Pa., a corporation of Pennsylvania No Drawing. Application January 17, 1957
Serial No. 634,619

9 Claims. (Cl. 260—2.5)

This invention relates generally to cellular products, and more particularly to flexible cellular products having a substantially closed cell cellular system. Still more particularly, it relates to cellular, tetrapolymer compositions of matter containing certain narrowly defined blends of resins and rubbers.

In copending application Serial No. 538,262, filed October 3, 1955, there is described a flexible closed cell composition comprising a thermoplastic polyvinyl resin and a rubbery butadiene copolymer selected from the group consisting of butadiene-styrene and butadiene-acrylonitrile copolymers. The composition there described has achieved wide success as thermal insulation on piping systems. It has been found, however, that where such insulation is installed in the vicinity of electrical machinery capable of generating ozone, the ozone eventually attacks the insulation.

Accordingly, it is the primary object of the present invention to present a flexible cellular product which is highly ozone resistant. It is a further object to present a cellular flexible composition of matter which has a wide range of usefulness as thermal insulation.

These objects have been achieved in a surprisingly effective manner. The invention contemplates a composition which is a blend of two different kinds of rubbers and two different kinds of thermoplastic resins. The composition comprises relative proportions of about 100 parts by weight of a rubbery butadiene-styrene copolymer, about 60–115 parts by weight of a rubbery butadiene-acrylonitrile copolymer, about 35–75 parts by weight of polystyrene, and about 20–30 parts by weight of a vinyl chloride polymer. The cells in the cellular composition are formed by the gaseous decomposition of p,p'-oxybis (benzene sulfonyl hydrazide).

The rubbery butadiene-styrene copolymer to be used in the present invention is the well-known GR–S type of synthetic rubber. The amount of styrene copolymerized with the butadiene-1,3 will vary generally from about 3% to about 50% by weight, with the preferred rubber containing about 23% styrene. Such rubbers are well known and are readily available.

The second rubber essential for the composition of the present invention is a butadiene-acrylonitrile copolymer, a nitrile rubber. The amount of acrylonitrile in the copolymer molecule will generally be in the range of about 26%–40% by weight of the total molecule. For ease of handling, it has been found that those butadiene-acrylonitrile copolymers containing 30%–33% by weight acrylonitrile are preferable. This Buna N type of rubber is well known and may readily be obtained on the open market.

The amount of butadiene-acrylonitrile copolymer to be blended into the composition will vary broadly between about 60–115 parts by weight butadiene-acrylonitrile copolymer per 100 parts by weight butadiene-styrene copolymer. Larger amounts of Buna N yield a stiffer mixture which increases the difficulty of forming a low density material. Smaller amounts than those stated above cause a dropping off of the ozone resistance of the final composition. Although the broad range of amounts of the butadiene-acrylonitrile copolymer is as stated above, the preferred range is about 70–80 parts per 100 parts butadiene-styrene copolymer, and still more preferably 75 parts.

Polystyrene is one of the two thermoplastic resins that must be present in the composition of the present invention. The presence of polystyrene aids in imparting processability to the mix and facilitates the free expansion step, to be described later. The presence of the polystyrene also insures reproducibility of product within very close tolerances. Any of the usual polystyrenes with molecular weights between 50,000 and 300,000 can be used, but it is preferred to utilize those having a molecular weight of 200,000 to 300,000.

The amount of polystyrene to be used will be in the range of about 35–75 parts by weight per 10 parts by weight butadiene-styrene copolymer; more preferably 60 parts by weight polystyrene will be used. Amounts of polystyrene outside of the broad range of 35–75 parts by weight given above brings about changes in the properties of the final cellular composition which are generally undesirable.

The second thermoplastic resin to be used in the composition of the present invention is a vinyl chloride polymer; this term is intended to include both polyvinyl chloride and vinyl chloride-vinyl acetate copolymers. It is not necessary that the vinyl chloride polymer be compatible with both of the rubbery copolymers described earlier, but the thermoplastic resin must be at least dispersible at elevated temperatures in the rubbers. In any case the vinyl chloride polymer will be largely compatible with the nitrile rubber. The amount of the vinyl chloride polymer to be used will vary broadly between about 20–30 parts by weight resin per 100 parts by weight butadiene-styrene copolymer. The preferred amount is about 24–27 parts by weight, specifically about 25 parts by weight.

The vinyl chloride polymer needed for the present invention may be obtained in the form of a mixture with a butadiene-acrylonitrile copolymer. This mixture is sold under the name "Polyblend." Where one of the Polyblends is used, the amounts of vinyl chloride polymer and butadiene-acrylonitrile copolymer in the Polyblend must be taken into account when calculating the amounts of the four polymers to be used in the tetrapolymer composition of the present invention.

The general ratios of total elastomers to total thermoplastics are between 100:25 and 100:65 parts by weight. The ozone resistance of the final composition drops off rapidly when the amount of the vinyl chloride polymer drops below about 9% of the total blend or about 33% of the nitrile rubber. The amount of thermoplastic polymers can be higher in the present tetrapolymer blends than in the blends described in copending application Serial No. 538,262. This is true since the addition of the vinyl chloride polymer does not produce the excessive thermoplastic characteristics in the finished cellular product as would a comparable increase in polystyrene alone. Excessive thermoplastic resins of either type described above reduce the expansion of the mix, while insufficient resin produces rough, nonuniform expansions with a general open cell structure. Thus the ingredients and the amounts in the present tetrapolymer blends must be adhered to if a flexible closed cell product is to result. It is the unobvious contribution of the present invention that these tetrapolymer blends of four restricted ingredients, each to be used in only certain amounts, could result in a flexible closed cell cellular product.

Various fillers may be incorporated into the mix in order to give the final product the desired body. Examples of such fillers are limestone, TiO₂, slate flour, clay, silica, and carbon black. The total amount of filler will generally run about 5–60 parts by weight per 100 parts by weight total rubber, and preferably will be between 35–45 parts by weight per 100 parts by weight total rubber. Mixtures of fillers can be used if desired. It is often convenient to incorporate antimony trioxide as part or all of the filler system in order to impart flame resistance to the final cellular product. The antimony trioxide is preferably used in an amount of 10–20 parts by weight per 100 parts by weight total rubber. Pigments may be incorporated in order to impart the desired color to the final product; products having different colors are useful in keying a piping system to aid in the identification of the substances carried by the individual pipe lines. Where a black product is needed, carbon black may be incorporated to strengthen the final product as well as to impart a uniform dead black color to the final product.

Any of the plasticizers normally used with resin or rubber systems may be incorporated into the present composition. The high boiling esters, ethers, and ketones, for example tricresyl phosphate, dibutyl phthalate, di-2-ethyl hexyl phthalate, butyl phthalyl butyl glycollate, dibutyl sebacate, and the like, are all suitable. Lubricants such as stearic acid, including waxes such as paraffin and ceresin wax or wax mixtures, may be used in small amounts. Chlorinated paraffins which generally contain 38%–70% by weight chlorine can be used as a combination plasticizer and fire-retardant agent, particularly where antimony trioxide is used as part of the filler system. Other chlorinated plasticizers are suitable.

Generally speaking, the amount of plasticizer is not critical. The amount of plasticizer normally used to give good workable compositions will suffice in the present case. As is well-known, too large an amount of plasticizer will yield a soft product having extremely flexible cell walls. The amount of plasticizer will generally range between about 5 to 60 parts by weight per 100 parts by weight total rubber, and preferably about 3–50 parts by weight per 100 parts by weight total rubber.

The blowing agent to be used in the present invention is the compound p,p'-oxybis (benzene sulfonyl hydrazide). Use of this compound yields the unusually excellent product of the present invention. Both the compound itself and its degradation products appear to function as curing agents, thus rendering unnecessary the need for any sulfur or similar curing agent in the composition. The compound appears to possess an excellent balance between blowing and curing properties in the present tetrapolymer composition. The same results cannot be obtained when using a different blowing agent. This hydrazide when used to blow the particular composition disclosed herein yields an extraordinarily uniform cell structure wherein the great majority of the cells are of the closed cell type. Furthermore, the closed cell structure maintains its integrity even under a high degree of flexing and bending.

Generally speaking, the amount of the p,p'-oxybis (benzene sulfonyl hydrazide) to be added to the composition will vary between about 1–35 parts by weight per 100 parts by weight total rubber. It is apparent that varying the amount of the blowing agent will cause varying amounts of expansion when the composition is heated to decompose the blowing agent. Thus, although the degree and size of the porosity may be controlled by the amount of blowing agent to be added, it has been found that the optimum cell size and structure for general all-around use is obtained when the blowing agent is incorporated in an amount of about 15–21 parts by weight per 100 parts by weight total rubber.

No sulfur is needed to cure the composition of the present invention, since the p,p'-oxybis (benzene sulfonyl hydrazide) serves as adequate curing agent in most instances. Should additional cure be desired, however, such may be obtained by the use of peroxides or other materials normally used as curing agents.

The composition of the present invention is blended in accordance with known practices. The two rubbers may be first broken down on a Banbury, after which the two resins may be incorporated therein with the aid of heat, usually between about 250° to about 350° F., depending on the softening points of the two resins. Alternatively, the two resins may first be softened on a mill and the two rubbers, previously broken down, may then be added. When these four ingredients have been thoroughly intermingled, as for example after about 10 minutes of hot mixing, the filler, as for example carbon black plus antimony trioxide, if such is to be added, may be incorporated into the tetrapolymer blend on the mill followed by addition of the plasticizer system and any other ingredients. Once blending is complete, the composition may be stored if desired. As a final step in the preparation of the composition, the filled and plasticized tetrapolymer blend may be cold milled during which time the blowing agent and any additional curing agent may be added. Intimate dispersion of the blowing agent in the mix is required in accordance with good practice.

Subsequent to the blending of the completed composition, the composition may be formed into the desired shape as by extrusion, calendering, or other shape-forming operation. Extrusion may be carried out on the standard extruders found on the market capable of extruding a hollow cylinder, or other suitable shape. The extruder will preferably have various sized dies and pins in order that hollow cylinders having various inner and outer diameters and various wall thicknesses may be extruded therefrom. A cutter may be used in connection with the shape-forming mechanism to cut the blended composition into the desired length.

Once the composition has been formed into the desired shape, there remains only the step of heating the composition to a temperature sufficient to decompose the blowing agent. No molds are needed. The temperature of isotropic expansion should generally be in the range of about 250°–330° F. Preferably the temperature is about 300° F. Thus the shaped object is placed in an oven or similar enclosure, heated to a temperature in the range given above until expansion has ceased. On cooling, the cured product of the present invention is completed.

The heating step may be carried out in two stages if desired. The shaped object may be heated initially to a temperature in the range of about 200°–230° F., and preferably about 220° F., and maintained at that temperature for about 30–60 minutes. This preheating step accomplishes a certain degree of precure. This precure can be used to control to some extent the stiffness of the final product. If the precure step is carried out for too long a period of time, the final product may be too stiff or indeed it may not fully expand when the temperature is finally raised sufficient to decompose all the blowing agent. A short period of precure, however, can serve to stiffen up a product which might otherwise be too too limp once the blowing agent has decomposed. It must be emphasized that the precure step is not essential but is merely a matter of convenience.

Although the degree of expansion will depend in large measure on the amount of blowing agent incorporated in the composition, where consistent amounts of blowing agent are used, the expansion follows a predetermined path and is completely reproducible. Using preferred amounts of the blowing agent, the ratio of the original length to the expanded length will generally be about 1:1.8. The ratio of the original inner diameter and outer diameter to the expanded inner diameter and outer diameter of a hollow cylinder will be about 1:2.1. Use of consistent amounts of the blowing agent within the broad range given above but outside of the preferred range will soon establish different ratios of unexpanded dimensions to expanded dimensions. It is one of the surprising advantages of the present invention that the final product is unexpectedly reproducible within unusually close tolerances. It is not to be anticipated that an expansion carried out in the absence of molds as is done herein could consistently result in a reproducible isotropic expansion. Thus where any flexible cellular object is to be produced, it is a simple matter to determine the size of the unexpanded object which will expand into the desired size.

The product of the present invention will be found to have excellent properties from a thermal insulation standpoint. The product has low thermal conductivity, very low water vapor and air permeability, and low water absorption; this latter factor is due to the closed cell system in the product. The thermal conductivity has been found to be approximately the same as that of corkboard. The product is an excellent vapor barrier throughout its entire thickness, since many samples of varying thicknesses yield the same low figure. The water pick-up after 15 days of total immersion in water is only about 14% by weight, emphasizing the excellence of the closed cell system that exists throughout the product.

The following examples illustrate several embodiments of the invention. All parts are by weight unless otherwise stated.

*Example I*

Onto a mill maintained at about 300° F. was placed 60 parts polystyrene and 25 parts vinyl chloride-vinyl acetate copolymer containing about 10% by weight vinyl acetate (VYNS). When the resins fused there was added separately 100 parts butadiene-styrene copolymer (GR-S 1001) and 75 parts butadiene-acrylonitrile copolymer containing 30%–33% acrylonitrile (Hycar 1002), both rubbers having been previously broken down on a mill. Mixing was continued at about 320° F. until the four polymers were fused together.

To the mix on the mill was added 15 parts of a channel carbon black (EPC) and 60 parts of a reinforcing furnace carbon black (SRF) and 20 parts antimony trioxide. After thorough mixing, there was added 70 parts chlorinated paraffin containing 38%–42% chlorine (Chlorowax 40), 1 part paraffin, and 2 parts of a lead phosphite, a heat and light stabilizer (Dyphos). After thorough mixing, the entire mixture was dumped.

The cooled mix was put on a mill cooled with refrigerated water and there was added 33 parts p,p'-oxybis (benzene sulfonyl hydrazide) and cold milling was continued for 10 minutes.

A portion of the mix was removed from the mill in the form of a sheet while another portion was placed directly in a Royle extruder and extruded through a die to form a hollow cylinder. Both specimens were placed in an oven maintained at 220° F. and left there for 60 minutes, following which the temperature was raised to 300° F. After an additional 60 minutes, the expanded objects were removed from the oven and cooled. The hollow cylinder had a density of 8.3 pounds per cubic foot, an expanded inner diameter of ⅞", and a wall thickness of ½". The expanded sheet had a density of 8.3 pounds per cubic foot and measured ½" in thickness.

The products were flexible and were found to possess a substantially closed cell cellular system. Ozone resistance of the expanded compositions was extraordinarily high.

*Example II*

A composition was prepared as in Example I save the following ingredients were used:

| Ingredients: | Parts |
| --- | --- |
| Butadiene-styrene copolymer (23% styrene) | 100 |
| Polystyrene (KTPL #6, 176° C. ring and ball) | 40 |
| Butadiene-acrylonitrile copolymer (Hycar 1002) | 70 |
| Blend containing 55% polyvinyl chloride and 45% butadiene-acrylonitrile copolymer (Polyblend 503) | 75 |
| Carbon black (EPC) | 35 |
| Antimony trioxide | 15 |
| Chlorinated paraffin (Chlorowax 40) | 90 |
| p,p'-Oxybis (benzene sulfonyl hydrazide) | 36 |

The density of hollow cylinders made from the above composition was 8.9 pounds per cubic foot after the composition had been extruded and subjected to a free expansion at 300° F.

*Example III*

The procedure of Example I was repeated except that the following ingredients were used:

| Ingredients: | Parts |
| --- | --- |
| Butadiene-styrene copolymer (GR-S 1001) | 100 |
| Polystyrene (8X) | 60 |
| Butadiene-acrylonitrile copolymer (Hycar 1002) | 75 |
| Vinyl chloride-vinyl acetate copolymer (VYNS-3) | 25 |
| Paraffin | 0.5 |
| Carbon black (EPC) | 20 |
| Carbon black (SRF) | 60 |
| Antimony trioxide | 20 |
| Chlorinated paraffin (Chlorowax 40) | 70 |
| p,p'-Oxybis (benzene sulfonyl hydrazide) | 33 |

Sheets rods, and tubes made from the above composition were subjected to free expansion in the usual manner. Products having a density of 8.1 pounds per cubic foot resulted.

*Example IV*

The procedure of Example I was repeated except that the following ingredients were used. The peroxide was added with the blowing agent.

| Ingredients: | Parts |
| --- | --- |
| Butadiene-styrene copolymer (GR-S 1006) | 100 |
| Polystyrene (8X) | 37.5 |
| Butadiene-acrylonitrile copolymer (Hycar 1002) | 50 |
| Blend of 55% polyvinyl chloride, 45% butadiene-acrylonitrile copolymer (Polyblend 503) | 60 |
| Paraffin | 0.5 |
| Dioctyl phthalate | 5 |
| Titanium dioxide | 50 |
| Dicumyl peroxide | 4 |
| Pigment (BT-320, blue) | 3 |
| p,p'-Oxybis (benzene sulfonyl hydrazide) | 24 |

The products made from this composition had a density of 8.2 pounds per cubic foot, were colored light blue, and had appreciably more "snap" than did the products made in the absence of the additional peroxide curing agent. Ozone resistance of these products was as high as that of the preceding products.

I claim:

1. A composition of matter comprising a flexible cellular substantially closed cell blend prepared by the process of blending relative proportions of about 100 parts by weight of a rubbery butadiene-styrene copolymer, about 60–115 parts by weight of a rubbery butadiene-acrylonitrile copolymer, about 35–75 parts by weight of polystyrene, and about 20–30 parts by weight of a vinyl chloride polymer, said cells being formed by the thermal decomposition of p,p'-oxybis (benzene sulfonyl hydrazide) at a temperature in the range of about 250°–330° F.

2. A composition according to claim 1 wherein said vinyl chloride polymer comprises polyvinyl chloride.

3. A composition according to claim 1 wherein said vinyl chloride polymer comprises a vinyl chloride-vinyl acetate copolymer.

4. A composition according to claim 1 containing filler in an amount of about 5–60 parts by weight filler per 100 parts by weight total rubber.

5. A composition according to claim 4 wherein said filler comprises carbon black.

6. A composition according to claim 1 containing plasticizer for said resins in an amount of about 5-60 parts by weight plasticizer per 100 parts by weight total rubber.

7. A composition according to claim 6 wherein said plasticizer is present in an amount of about 30-50 parts by weight per 100 parts by weight total rubber.

8. A composition according to claim 1 containing plasticizer comprising chlorinated paraffin wax and filler comprising carbon black and antimony trioxide.

9. A composition according to claim 1 wherein said butadiene-acrylonitrile copolymer is present in an amount of about 70-80 parts by weight, said polystyrene is present in an amount of about 55-65 parts by weight, and said vinyl chloride polymer is present in an amount of about 24-27 parts by weight.

References Cited in the file of this patent

UNITED STATES PATENTS

| | | |
|---|---|---|
| 2,739,082 | Bezman et al. | Mar. 20, 1956 |
| 2,741,624 | Hunter | Apr. 10, 1956 |

UNITED STATES PATENT OFFICE
CERTIFICATE OF CORRECTION

Patent No. 2,873,259

February 10, 1959

Lawrence Clark

It is hereby certified that error appears in the printed specification of the above numbered patent requiring correction and that the said Letters Patent should read as corrected below.

Column 2, line 18, for "10 parts" read -- 100 parts --; column 4, line 61, for "too", first occurrence, read -- be --; column 6, line 29, after the word "Sheets" insert a comma.

Signed and sealed this 2nd day of June 1959.

(SEAL)

Attest:

KARL H. AXLINE
Attesting Officer

ROBERT C. WATSON
Commissioner of Patents